United States Patent
Tsai et al.

(10) Patent No.: US 10,848,219 B2
(45) Date of Patent: Nov. 24, 2020

(54) VIRTUAL REALITY DOCKING STATION

(71) Applicant: HEWLETT-PACKARD DEVELOPMENT COMPANY, L.P., Houston, TX (US)

(72) Inventors: Ming-Shien Tsai, Taipei (TW); Yk Hsieh, Taipei (TW); Leo Joseph Gerten, Austin, TX (US); Chung-Chun Chen, Taipei (TW); David Hsieh, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 156 days.

(21) Appl. No.: 16/092,200

(22) PCT Filed: Jul. 29, 2016

(86) PCT No.: PCT/US2016/044766
§ 371 (c)(1),
(2) Date: Oct. 8, 2018

(87) PCT Pub. No.: WO2018/022095
PCT Pub. Date: Feb. 1, 2018

(65) Prior Publication Data
US 2020/0336183 A1    Oct. 22, 2020

(51) Int. Cl.
*H04B 7/06* (2006.01)
*H04W 16/28* (2009.01)
(Continued)

(52) U.S. Cl.
CPC .......... *H04B 7/0617* (2013.01); *G06F 3/012* (2013.01); *H01Q 1/38* (2013.01); *H01Q 21/0087* (2013.01); *H04W 16/28* (2013.01)

(58) Field of Classification Search
CPC .................................................. H04B 7/0617
See application file for complete search history.

(56) References Cited

U.S. PATENT DOCUMENTS 6,031,503 A * 2/2000 Preiss, II ......... G06K 19/07743
343/770
8,912,968 B2 12/2014 Sharma et al.
(Continued)

FOREIGN PATENT DOCUMENTS

CN    103956560 A    7/2014
CN    104009277 A    8/2014
(Continued)

OTHER PUBLICATIONS

Narbudowicz, A., et al., Miniaturization of Omnidirectional Circularly Polarized Antennas, Apr. 6-11, 2014, < http://ieeexplore.ieee.org/xpl/articleDetails.jsp?arnumber=6902437 >.

*Primary Examiner* — Hsinchun Liao
(74) *Attorney, Agent, or Firm* — HPI Patent Department

(57) ABSTRACT

The present subject matter relates to a wireless virtual reality (VR) docking station. In an example implementation of the present subject matter, the wireless VR docking station includes a first array antenna and a second array antenna disposed on a bezel of the wireless VR docking station. Each of the first array antenna and the second array antenna has an omnidirectional radiation pattern and is folded into two parts such that a first part transmits signals on one side of the bezel and a second part transmits signals on another side of the bezel.

15 Claims, 3 Drawing Sheets

(51) Int. Cl.
*H01Q 1/38* (2006.01)
*G06F 3/01* (2006.01)
*H01Q 21/00* (2006.01)

(56) References Cited

U.S. PATENT DOCUMENTS

| | | |
|---|---|---|
| 2002/0183032 A1 | 12/2002 | Fang |
| 2005/0146470 A1 | 7/2005 | Li et al. |
| 2009/0322621 A1* | 12/2009 | Inanoglu ............. H01Q 21/064 343/702 |
| 2010/0240327 A1 | 9/2010 | Lambrecht et al. |
| 2012/0328036 A1 | 12/2012 | Chang |
| 2014/0347249 A1 | 11/2014 | Bourilkov et al. |
| 2015/0349418 A1 | 12/2015 | Patron et al. |
| 2016/0162012 A1* | 6/2016 | Chang .................. G06F 1/3265 345/211 |
| 2016/0163283 A1 | 6/2016 | Chang et al. |

FOREIGN PATENT DOCUMENTS

| | | |
|---|---|---|
| CN | 101529657 B | 9/2014 |
| CN | 105677015 A | 6/2016 |
| DE | 102012012090 A1 | 12/2013 |
| EP | 3029550 | 6/2016 |
| WO | WO-2009029520 | 3/2009 |

\* cited by examiner

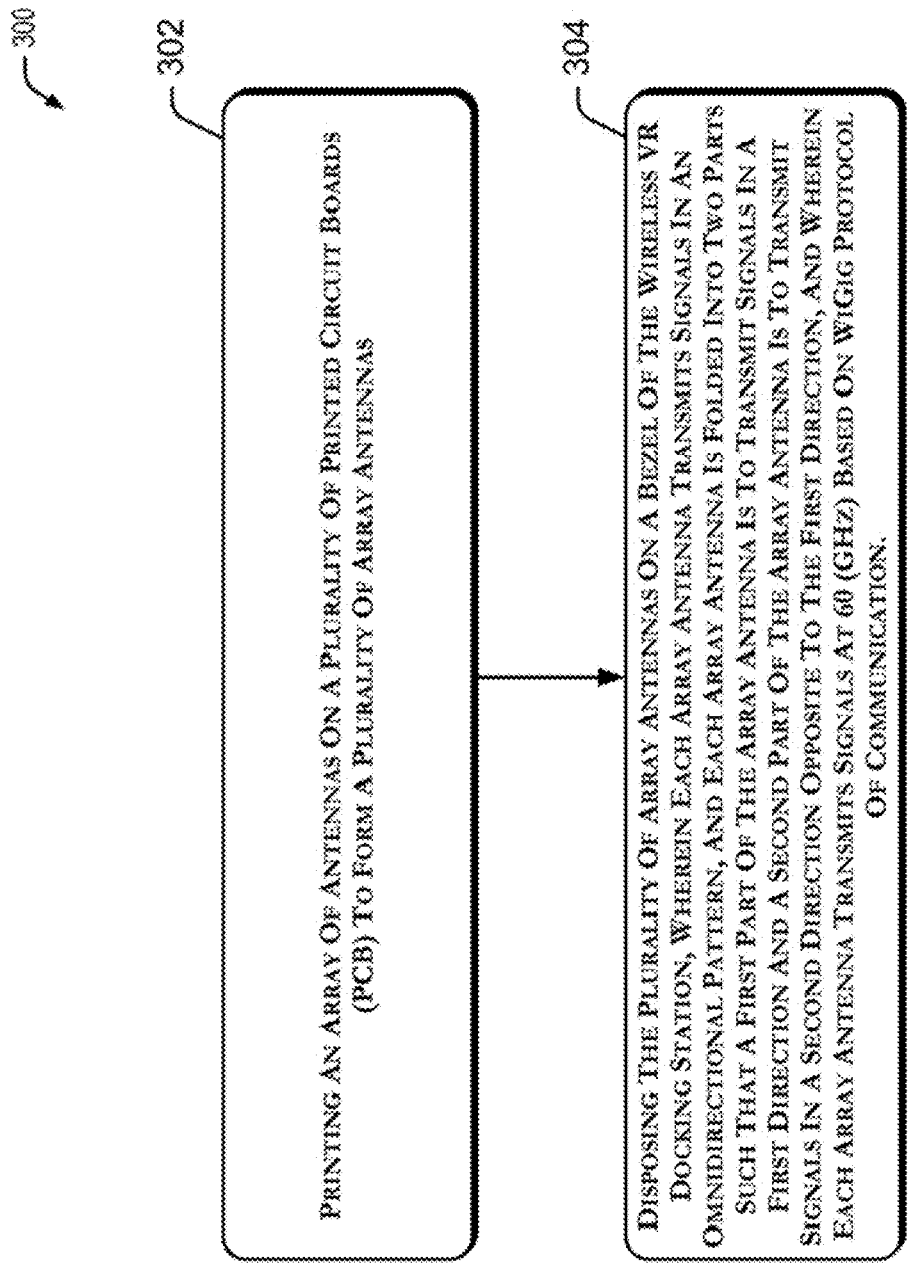

VIRTUAL REALITY DOCKING STATION

BACKGROUND

Virtual Reality (VR) devices provide immersive virtual experience to users by engaging the users in simulated environments displayed on the VR device's display unit. The VR devices are generally worn around the head of a user such that the display unit of the VR device covers the eyes and rests on the face of the user. The VR devices are typically connected to docking stations, such as computing systems, gaming stations, smartphones, via a cable through which multimedia content is streamed to the VR devices.

BRIEF DESCRIPTION OF DRAWINGS

The detailed description is described with reference to the accompanying figures. It should be noted that the description and figures are merely examples of the present subject matter and are not meant to represent the subject matter itself.

FIG. 3 illustrates a method of forming a wireless VR docking station, according to an example implementation of the present subject matter.

DETAILED DESCRIPTION

Figure 1:
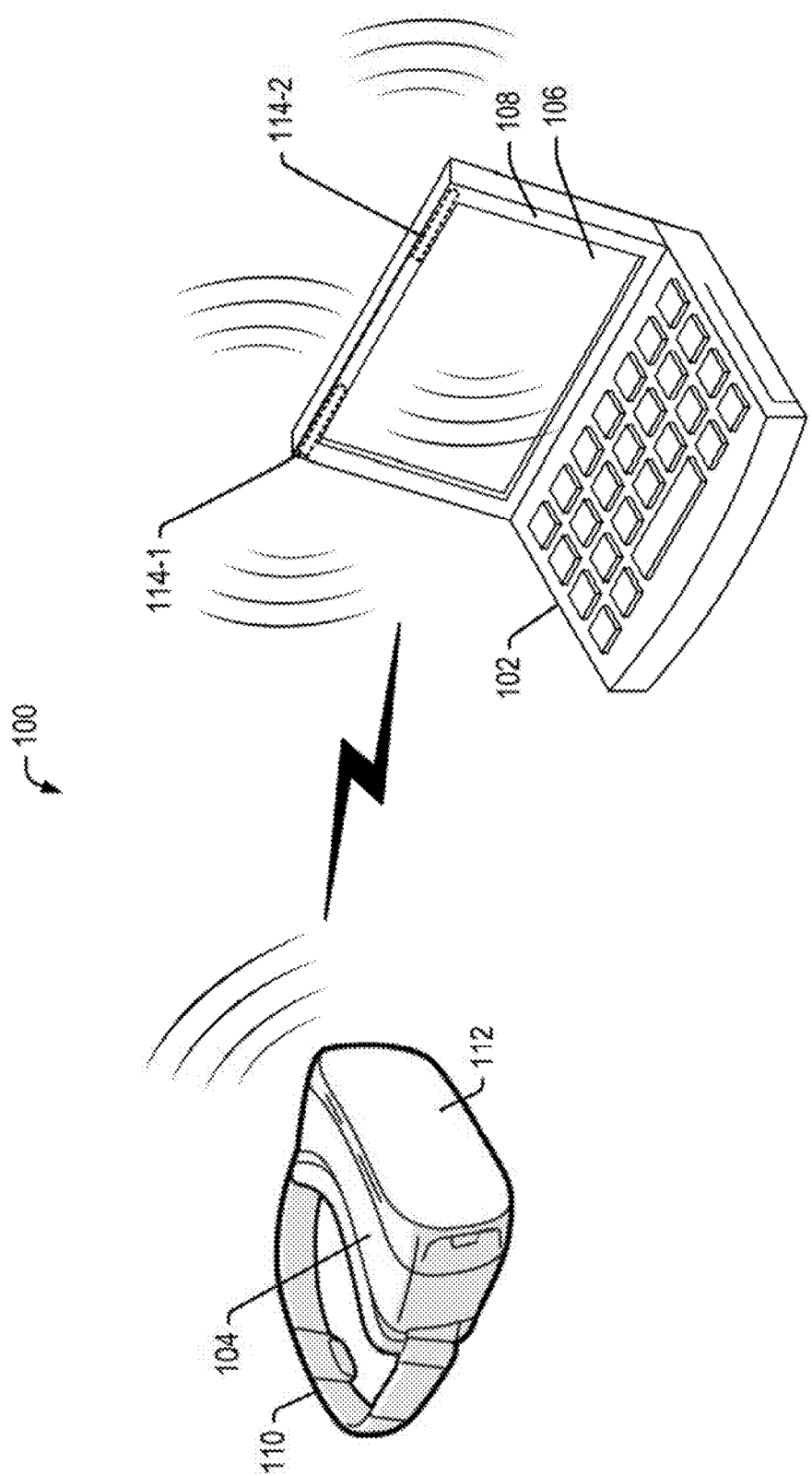
FIG. 1 illustrates a communicating environment implementing a virtual reality (VR) docking station, according to an example implementation of the present subject matter.

The present subject matter relates to wireless virtual reality (VR) docking station. The described techniques allow the wireless VR docking station to wirelessly exchange data in all directions, thereby allowing omnidirectional communication between the VR docking station and the VR devices. While the techniques of the present subject matter have been described in reference to VR devices, it would be noted that the techniques may also be implemented in other communication devices, such as Augmented Reality (AR) devices.

Generally, VR docking stations are connected to VR devices such as headsets, headgears or head mounted displays (HMD) through a wired connection, such as a High-Definition Multimedia Interface (HDMI) cable or a Universal Serial Bus (USB) cable. The wired connection allows the VR docking stations to transmit data, such as multimedia content to the VR devices. However, the wired connection constrains the range of communication of the VR docking station with the VR device and also limits capability of the user to move freely while connected to the VR docking station.

For wireless communication, some docking stations are equipped with wireless antennas. Such antennas have limited coverage and transmission characteristics to transmit signals and therefore the signals may have jitter or delay during reception. Such reception of signals may affect seamless rendering of the multimedia content at the VR device thereby affecting virtual experience of the user. Also, the limited coverage of the antennas may constrain the users from engaging in interactive multimedia that includes frequent user movements and change in position and orientation of the VR device.

According to example implementations of the present subject matter, techniques for facilitating wireless communication between the wireless VR docking station and the VR devices are described. The described techniques allow communication between the VR devices and the VR docking station in all directions at high rates of data exchange. Further, the described techniques allow uninterrupted exchange of data to provide multimedia content to the VR device seamlessly. Furthermore, the described techniques allow radiation of signals in all directions thereby facilitating free movement of the user and change in position or orientation of the VR device.

In an example implementation of the present subject matter, a wireless VR docking station is described. The wireless VR docking station may communicate with a VR device to transmit data, such as multimedia content, to the VR device through wireless signals. Examples of the VR docking station can be a gaming station or a computing device, such as a laptop, a desktop, and a tablet, having a display area with a display screen surrounded by a bezel.

As per an example of the present subject matter, the VR docking station comprises a first array antenna disposed at a first location on the bezel of the VR docking station. For instance, the first array antenna may be placed within one end of the bezel. The first array antenna is folded into two parts and placed within the bezel, such that a first part may transmit wireless signals on one side of the bezel and a second part may transmit wireless signals on another side of the bezel.

Further, a second array antenna is disposed at a second location, for instance an opposite end of the bezel. In an example, the first location and the second location on the bezel are selected to provide a wide coverage for wireless signals transmitted by the first array antenna and the second array antenna disposed at such locations.

Similar to the first array antenna, the second array antenna is folded into two parts and placed within the bezel such that the first part may transmit wireless signals on one side of the bezel and the second part may transmit wireless signals on another side of the bezel.

The first array antenna and the second array antenna have an omnidirectional radiation pattern and therefore transmit and receive wireless signals in all directions. In an example, the first array antenna and the second array antenna may operate at about 60 Giga Hertz (GHz), based on Wireless Gigabit Alliance (WGA) or WiGig protocol of communication. The transmission of the wireless signals in the frequency of 60 GHz may allow efficient and reliable transfer of multimedia content between the wireless VR device and the docking station.

Therefore, utilizing the array antennas in a folded position and disposed at different locations on the bezel increase coverage of the wireless signals and range of communication with the VR device thereby facilitating free movement of the user while engaged with the VR device and enhance virtual experience of the user. Further, the array antennas operating at about 60 GHz based on WiGig protocol allow efficient and seamless data transfer between the VR docking station and the VR device.

The present subject matter is further described with reference to FIG. 1, FIG. 2, and FIG. 3. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a communication environment 100, according to an example implementation of the present subject matter. The communication environment 100 includes a wireless VR docking station 102 in communication with a VR device 104. The wireless VR docking station 102 may be a computing device, such as a desktop computer, a hand-held computing device, a laptop, portable computers, network computers, or wireless handheld devices, such as mobile phones, personal digital assistant (PDA), smartphones dash top mobiles, and multi-media enabled phones, which are capable of wirelessly streaming data to the wireless VR device 102. In another example, the VR docking station 102 may be a gaming station or a gaming machine to execute a video based game and transmit data related to the game to the VR device 104. Further, the VR docking station 102 may include a display area including a display screen 106 and a bezel 108 surrounding the display screen 106.

The VR device 104 may be a VR headset, or a headgear having antennas to wirelessly communicate with the wireless VR docking station 102. The VR device 104 may include a headband 110 and a display unit 112 such that the headband 110 when strapped around a user's head, may support the display unit 112 around eyes of the user.

In an example implementation, the wireless VR docking station 102 may be connected to a communication network (not shown), which may be a wireless or a wired network, or a combination thereof. The communication network may be a collection of individual networks, interconnected with each other and functioning as a single large network, for example, the internet or an intranet. Few or all of the communication networks may be implemented as one of the different types of networks, such as local area network (LAN), wide area network (WAN), Wireless Local Area Network (WLAN), and such. Further, the communication network may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other.

In an example implementation of the present subject matter, a first array antenna 114-1, and a second array antenna 114-2 may be disposed at a first location and a second location within the bezel 108 respectively. For sake of explanation, the first array antenna 114-1 and the second array antenna 114-2 may be commonly referred to as array antennas 114 and individually referred to as an array antenna 114, hereinafter. The first array antenna 114-1 and the second array antenna 114-2 have an omnidirectional radiation pattern to transmit wireless signals in all directions. In an example, the array antennas 114 may transmit signals at 60 Giga Hertz (GHz) based on the Wireless Gigabit Alliance (WiGig) protocol of communication.

The first array antenna 114-1 and the second array antenna 114-2 are disposed within the bezel 108 such that the array antennas 114 transmit wireless signals on two sides of the bezel 108. For instance, if the first array antenna 114-1 is disposed at a top corner of the bezel 108, then the first array antenna 114-1 transmits wireless signals on frontal side of the bezel 108 such that a VR device at the front side of the bezel may receive the signals transmitted by the wireless VR docking station 102. Further, the first array antenna 114-1 may transmit signals at another side, such as the back side of the bezel 108, to transmit signals to a VR device 104 at the back side of the bezel 108. The transmission of the wireless signals in two sides of the bezel 108 increases coverage of the wireless signals.

Although the present subject matter describes the first array antenna 114-1 and the second array antenna 114-2 to be disposed within the bezel 108, the array antennas 114 may be disposed at any other location within the VR docking station 102 such that the array antennas 114 can wirelessly transmit signals to the VR device 104 without any physical obstruction.

Further, the signals transmitted from the array antennas 114 have increased signal strengths such that the signals reach the VR device 104 without any loss of data. Such signals allow transmission of high quality data and information to the VR device 104 at a location or orientation without any interruption in signal reception.

In an example, the first location and the second location may be selected such that the array antennas 114 disposed at respective locations can cover a wide angle of transmission and reception of the wireless signals.

Techniques described in the present subject matter allow uninterrupted reception of signals by the VR device 104 during user movement thereby providing seamless data transmission and enhancing the virtual experience of the user.

The detailed explanation of the functionalities of the VR docking station 102 has been further explained in conjunction with description of forthcoming figures.

Figure 2:
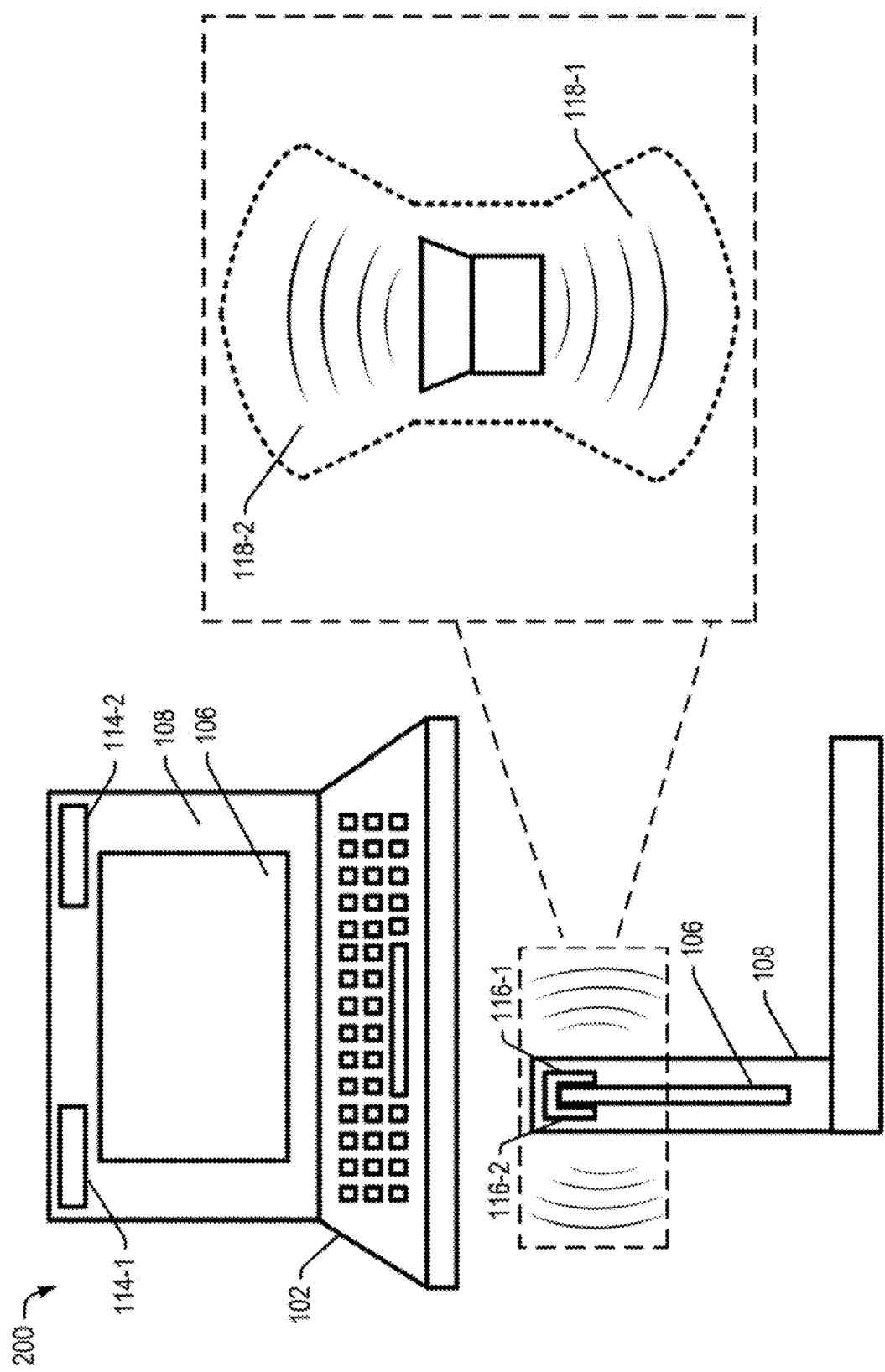
FIG. 2 illustrates a VR docking station, according to an example implementation of the present subject matter.

FIG. 2 illustrates the wireless VR docking station 102, according to an example implementation of the present subject matter. The wireless VR docking station 102 includes the display screen 106 surrounded by the bezel 108. The first array antenna 114-1 and the second array antenna 114-2 are disposed within the bezel 108 to transmit wireless signals to the VR device 104.

In an example implementation, the first array antenna 114-1 and the second array antenna 114-2 may include multiple antennas with each antenna to transmit the wireless signals to the VR device 104. In an example, the first array antenna 114-1 and the second array antenna 114-2 may each include five antennas. Each antenna from amongst the multiple antennas may be one of a loop antenna, a rhombic antenna, a slot antenna, a parabolic antenna and a helical antenna. The first array antenna 114-1 and the second array antenna 114-2 may transmit the signals with an omnidirectional radiation pattern such that the VR device 104 may receive the wireless signals in any direction. Further, the array antennas may transmit the signals uniformly in the three dimensional space.

In an example implementation, the first array antenna 114-1 and the second array antenna 114-2 may transmit the signals in one of an Ultra High Frequency (UHF) band, Super High Frequency (SHF) band and an Extremely High Frequency (EHF) band. In an example, the first array antenna 114-1 and the second array antenna 114-2 may transmit signals at 60 GHz based on WiGig protocol of communication. The transmission of signals at 60 GHz may allow seamless and high speed transfer of data and multimedia content between the VR device 104 and the VR docking station 102.

In an example, the first array antenna 114-1 and the second array antenna 114-2 may be printed on a Flexible Printed Circuit Board (FPCB) using known three dimensional (3D) printing techniques to form on chip antennas. The FPCB provides flexibility to the first array antenna 114-1 and second array antenna 114-2 for disposing within the bezel 108 in different alignments and positions.

In an example, the first array antenna 114-1 and the second array antenna 114-2 may be folded into two parts and may be placed around the display screen 106 such that each of the first array antenna 114-1 and the second array antenna 114-2 surrounds a portion of an edge of the display screen 106. The first part 116-1 is on one side of the display screen 106 and may transmit signals on the side of the bezel 108 and the second part 116-2 is on another side of the display screen 106 and may transmit signals on the other side of the bezel 108. For instance, the first part 116-1 may transmit signals in the region 118-1 and the second part 116-2 transmits the signals in the region 118-2. For sake of explanation, the regions 118-1 and 118-2 have also been referred to as first direction and second direction respectively, hereinafter. In an example, wireless signals transmitted by each part of the first array antenna 114-1 and second array antenna 114-2 cover an angle of 120°.

Further, the VR docking station 102 may include a sensing unit to determine location of the VR device 104 with respect to the wireless VR docking station 102. The sensing unit may then regulate signals of the first array antenna 114-1 and the second array antenna 114-2 for beam forming and directional exchange of data between the VR docking station 102 and the VR device 104 based on the determined location of the VR device 104.

For instance, if the VR device 104 is located within an area opposite to and facing the display screen 106, then the sensing unit may determine the location of the VR device 104 and regulate the radiation pattern of the wireless signals transmitted by the first array antenna 114-1 and the second array antenna 114-2. The radiation pattern may be regulated by utilizing a technique, such as beam forming, to form a beam and transmit the beam to the VR device 104. In an example, the sensing unit may utilize signal parameters such as wavelength, frequency, phase and amplitude of the signals and perform constructive interference of the signals to form the beam. The beam so obtained may have increased signal strength and may be received by the VR device 104 with minimal or no data loss thereby providing seamless transmission of data to the VR device 104. In an example, the sensing unit may determine the direction of the VR device 104 with respect to the wireless VR docking station 102 and perform data communication with the VR device 104 in the determined direction.

In operation, the sensing unit of the wireless VR docking station 102 may determine location of the VR device 104 and transmit the wireless signals to the VR device 104. As described earlier, the sensing unit may regulate the wireless signals transmitted from the first array antenna 114-1 and second array antenna 114-2 to form a beam and transmit the beam in the direction of the VR device 104. The VR device 104 may then receive the wireless signals and process the signals to display a real-time video or any other multimedia content on the display unit 112 to the user.

Thereafter, if the user moves to a new location, then the sensing unit may determine the new location and regulate the signals from the first array antenna 114-1 and the second array antenna 114-2 to transmit regulated signals in form of beam to the VR device 104 at the new location.

FIG. 3 illustrates a method 300 for forming a wireless VR docking station. The order in which the method 300 is described is not intended to be construed as a limitation, and any number of the described method blocks may be combined in any order to implement the method 300, or an alternative method.

Further, although the method 300 may be implemented in a variety of docking stations, such as computing systems of a computing environment, in an example described in FIG. 3, the method 300 is explained in context of the aforementioned wireless VR docking station 102, for ease of explanation.

Referring to FIG. 3, in an implementation of the present subject matter, at block 302, array of antennas are printed on multiple Printed Circuit Boards (PCB) to form multiple array antennas. In an example, the multiple array antennas may include two array antennas and each array antenna may include multiple antennas, for instance five antennas for transmitting wireless signals. In an example, the array of antennas may be printed on the PCB using a known 3D printing technique.

At block 304, the multiple array antennas are disposed on a bezel of the wireless VR docking station. Each array antenna from amongst the multiple array antennas transmits signals in an omnidirectional pattern. Further, each array antenna is folded into two parts such that the first part of the array antenna transmits signals in a first direction and the second part of the array antenna transmits signals in a second direction opposite to the first direction. Each array antenna transmits signals at 60 GHz based on WiGig protocol of communication. In an example implementation, the multiple array antennas are disposed on the bezel 108 of the wireless VR docking station 102.

In an example implementation, position of a VR device 104 with respect to the VR docking station 102 may be determined and signals of each array antenna from amongst the multiple array antennas may be regulated for transmitting data. For instance, a real-time video may be transmitted to the VR device 104 in the determined position. In an example, the data may be transmitted through beam forming and directional exchange to the VR device 104.

In another example implementation, the PCB may be a Flexible Printed Circuit Board (FPCB). The FPCB provides flexibility to the multiple array antennas for disposing within the wireless VR docking station 102 in different alignments and positions.

Therefore, the described techniques increase coverage of the wireless signals and range of communication of the wireless VR docking station with the VR device thereby facilitating free movement of the user while engaged with the VR device and enhance virtual experience of the user. Further, operation of the array antennas at about 60 GHz based on WiGig protocol allows efficient and seamless data transfer between the VR docking station and the VR device.

Although implementations of present subject matter have been described in language specific to structural features and/or methods, it is to be understood that the present subject matter is not necessarily limited to the specific features or methods described. Rather, the specific features and methods are disclosed and explained in the context of a few implementations for the present subject matter.

We claim:

1. A wireless Virtual Reality (VR) docking station comprising:
   a first array antenna disposed at a first location on a bezel of the VR docking station, the first array antenna having an omnidirectional radiation pattern, wherein the first array antenna is folded into two parts such that a first part of the first array antenna is to transmit signals on one side of the bezel and a second part of the first array antenna is to transmit signals on another side of the bezel; and
   a second array antenna disposed at a second location of the bezel, the second array antenna having an omnidirectional radiation pattern, wherein the second array antenna is folded into two parts such that a first part of the second array antenna is to transmit signals on one side of the bezel and a second part of the second array antenna is to transmit signals on another side of the bezel.

2. The wireless VR docking station as claimed in claim 1 further comprising a sensing unit, wherein the sensing unit is to:
   determine position of a VR device with respect to the VR docking station; and
   regulate signals of the first array antenna and the second array antenna for beam forming and directional exchange of data based on the determined position of the VR device.

3. The wireless VR docking system as claimed in claim 1, wherein the first array antenna and the second array antenna comprise at least five antennas each.

4. The wireless VR docking system as claimed in claim 1, wherein the first part and the second part of at least one of the first array antenna and the second array antenna surround a portion of an edge of a display screen disposed within the bezel.

5. The wireless VR docking station as claimed in claim 1, wherein the first array antenna and the second array antenna are printed as an on-chip antenna on a Flexible Printed Circuit Board (FPCB).

6. The wireless VR docking station as claimed in claim 5, wherein coverage of signals provided by at least one of the first part and the second part of the first array antenna and the second array antenna is about 120°.

7. The wireless VR docking station as claimed in claim 1, wherein each of the first array antenna and the second array antenna communicates with the VR device at about 60 Giga Hertz (GHz), based on Wireless Gigabit Alliance (WiGig) protocol of communication.

8. A method of forming a wireless Virtual Reality (VR) docking station, the method comprising:
   printing an array of antennas on a plurality of Printed Circuit Board (PCB) to form a plurality of array antennas;
   disposing the plurality of array antennas on a bezel of the wireless VR docking station, wherein each array antenna from amongst the plurality of array antennas transmits signals in an omnidirectional pattern, and each array antenna is folded into two parts such that first part of the array antenna is to transmit signals in a first direction and the second part of the array antenna is to transmit signals in a second direction opposite to the first direction, and wherein each array antenna transmits signals at 60 Giga Hertz (GHz) based on Wireless Gigabit Alliance (WiGig) protocol of communication.

9. The method as claimed in claim 8 further comprising determining position of a VR device with respect to the VR docking station to regulate signals of each of the plurality of array antennas for transmitting data to the VR device in the determined position.

10. The method as claimed in claim 9, wherein the data is transmitted through beam forming and directional exchange to the VR device.

11. The method as claimed in claim 8, wherein the plurality of array antennas comprise at least two array antennas.

12. The method as claimed in claim 8, wherein each of the plurality of array antennas comprises at least five antennas.

13. The method as claimed in claim 8, wherein the PCB is a Flexible Printed Circuit Board (FPCB).

14. The method as claimed in claim 8, wherein each of the plurality of array antenna wirelessly transmits data associated with a real-time video to at least one VR device.

15. The method as claimed in claim 8, wherein coverage of signals provided by at least one of the first part and the second part of at least one array antenna from amongst the plurality of array antennas is about 120°.

* * * * *